Dec. 22, 1925.
S. BARDY
1,566,360
FRAMING DEVICE
Filed June 5, 1922.
4 Sheets-Sheet 3
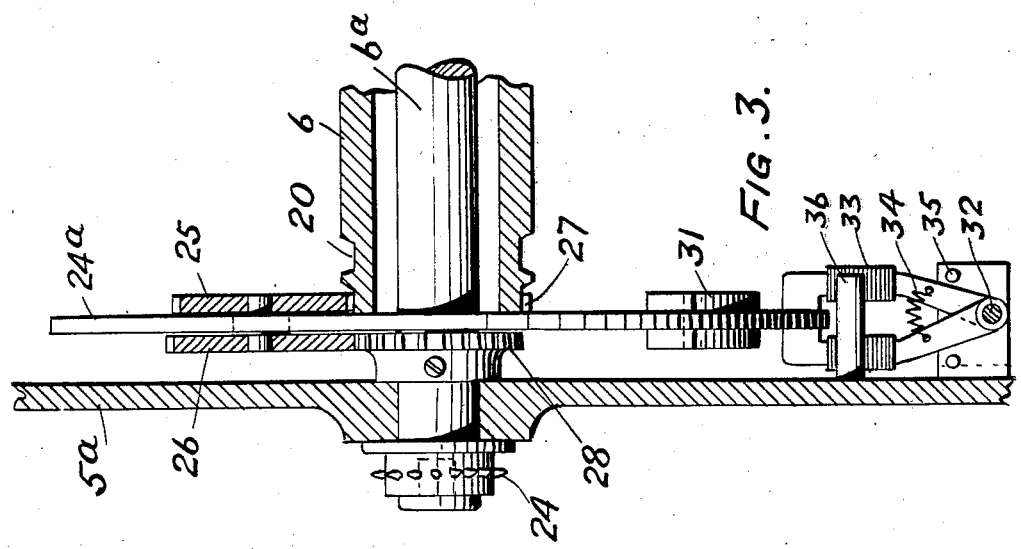
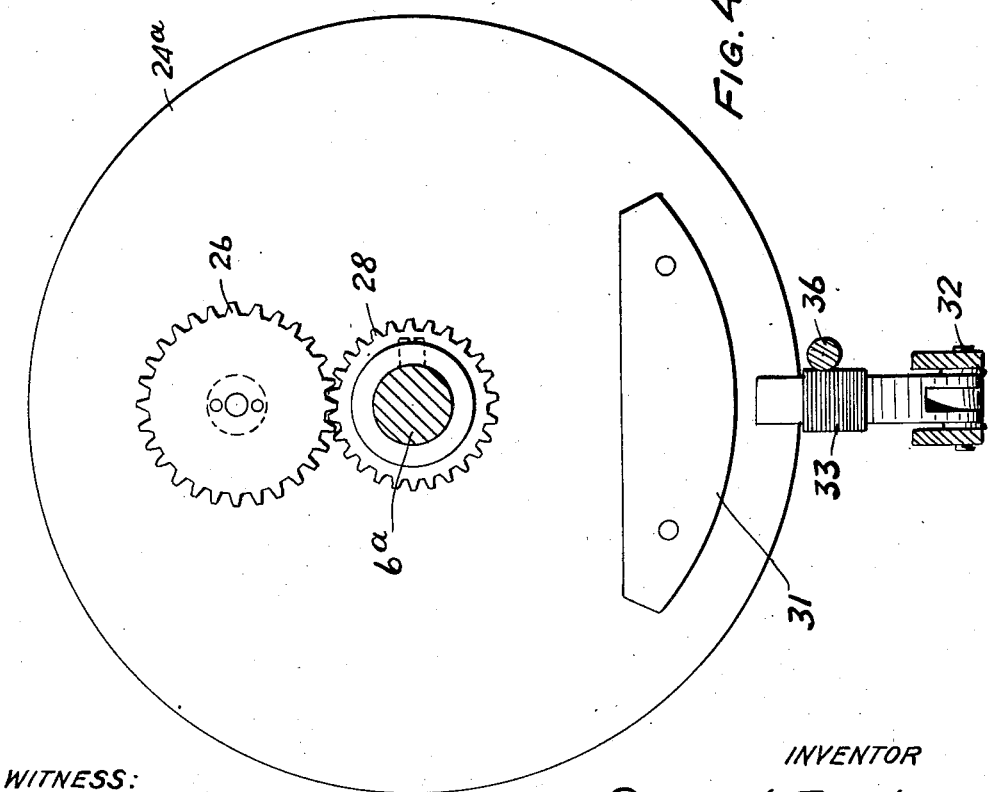
WITNESS:
Rob. R. Ketchel.
INVENTOR
Samuel Bardy
BY
Frank S. Busser
ATTORNEY.

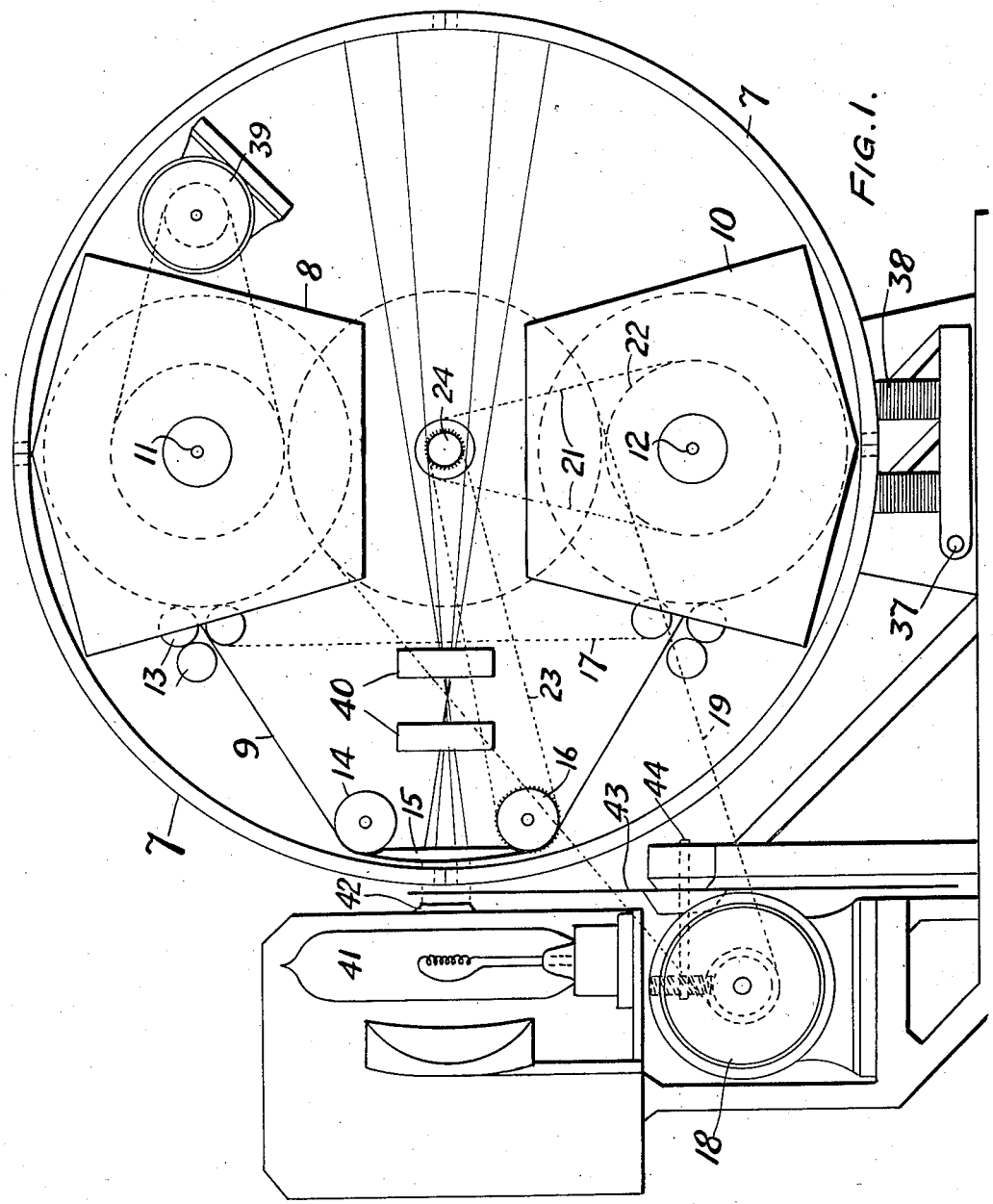

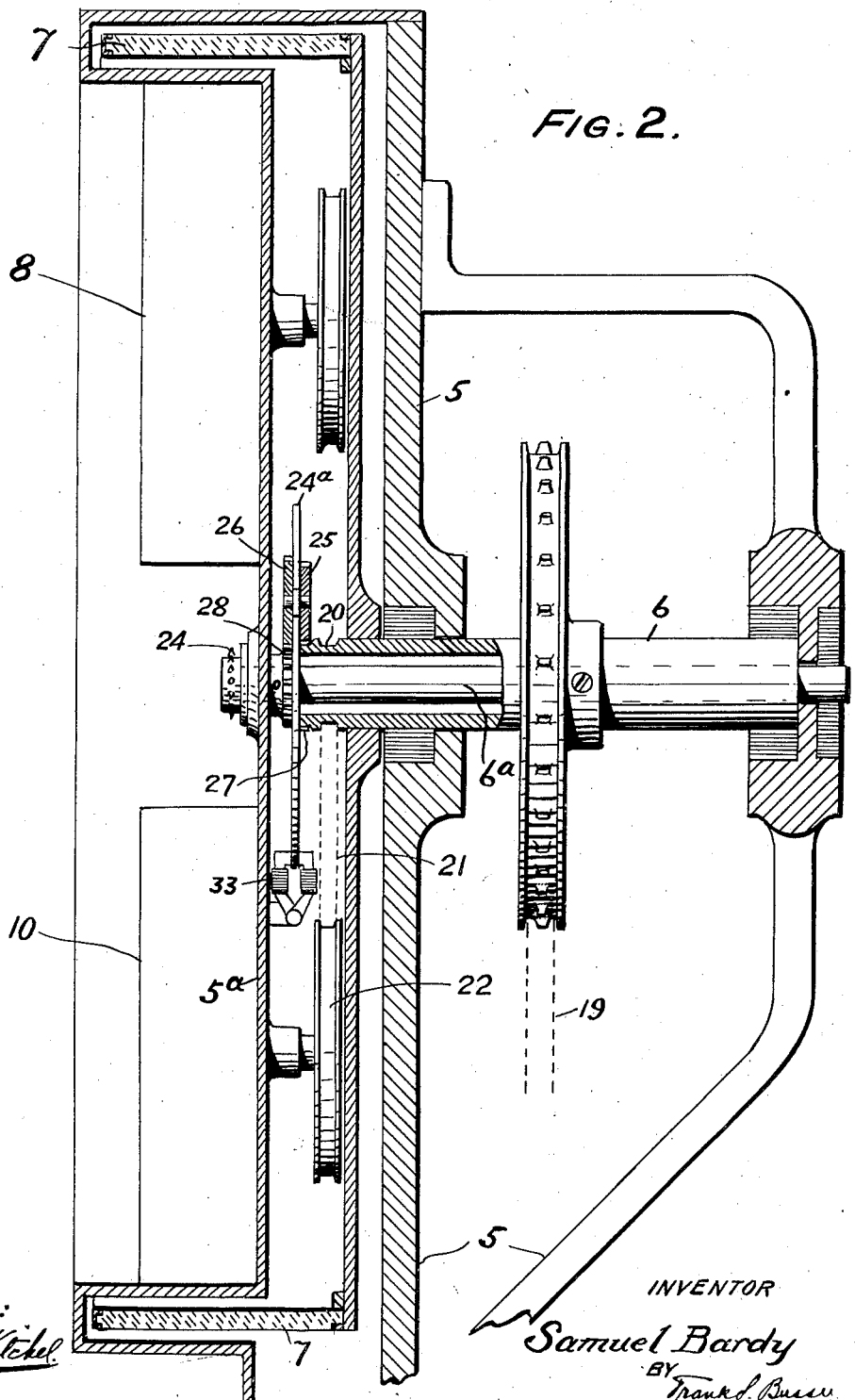

Dec. 22, 1925.                                                        1,566,360
S. BARDY
FRAMING DEVICE
Filed June 5, 1922                               4 Sheets-Sheet 4

WITNESS:
Rob R Litchel

INVENTOR
Samuel Bardy
BY
Frank S. Busser
ATTORNEY.

Patented Dec. 22, 1925.

1,566,360

UNITED STATES PATENT OFFICE.

SAMUEL BARDY, OF PHILADELPHIA, PENNSYLVANIA, ASSIGNOR TO BARDY MOTION PICTURE MACHINE COMPANY, OF PHILADELPHIA, PENNSYLVANIA, A CORPORATION OF DELAWARE.

FRAMING DEVICE.

Application filed June 5, 1922. Serial No. 566,172.

*To all whom it may concern:*

Be it known that I, SAMUEL BARDY, a citizen of the United States, residing at Philadelphia, county of Philadelphia, and State of Pennsylvania, have invented a new and useful Improvement in Framing Devices, of which the following is a full, clear, and exact description, reference being had to the accompanying drawings, which form a part of this specification.

This invention relates to an improvement in framing devices for moving picture projecting machines, and is more particularly adapted for machines in which both the film and an optical rectifying system are moved in a continuous manner.

One of the objects of my invention is to provide means operable from any desired station or stations in the house, whereby the picture projected on the screen can be shifted to its proper position by shifting the relative positions of the optical rectifying system and the film feeding mechanism to shift the successive film pictures relative to the exposing devices to center the pictures relatively thereof.

In a device to which I have applied my framing device the optical rectifying mechanism is driven in a continuous manner, while the film feeding mechanism is connected thereto by a gearing to feed the film in timed relation to the optical system, and if the film is not properly placed on the feeding sprocket wheel, the pictures will be out of register with the optical rectifying system and project a portion of two pictures on the screen.

In order to bring the pictures on the film and the optical rectifying system into register, I interpose differential gears between the film feeding sprocket and the optical rectifying system, which is arranged to be set into motion by electrically actuated mechanism, and which is so arranged that when the parts are in operation the film feeding mechanism is speeded up to advance the film with relation to the optical rectifying system, and when the film and rectifying system are in register the film and rectifying system are driven in synchronism.

The electrical actuating mechanism is of such a character that any number of framing stations may be provided, so that the framing may be effected from any one of said stations by simply pressing a button and retaining such button depressed until the picture has been framed.

The precise nature of my invention will be best understood by reference to the accompanying drawings, which will now be described, it being premised, however, that various changes may be made in the details of construction without departing from the spirit and scope of my invention as defined in the appended claims.

Fig. 1 is a front view, somewhat diagrammatic, of a motion picture projecting machine illustrating one form of my invention.

Fig. 2 is a vertical section through a machine, such as shown in Fig. 1.

Fig. 3 is a detail sectional view of the film feed sprocket drive shown in Fig. 2.

Fig. 4 is a face view of the gear connections shown in Fig. 3.

Figure 5:
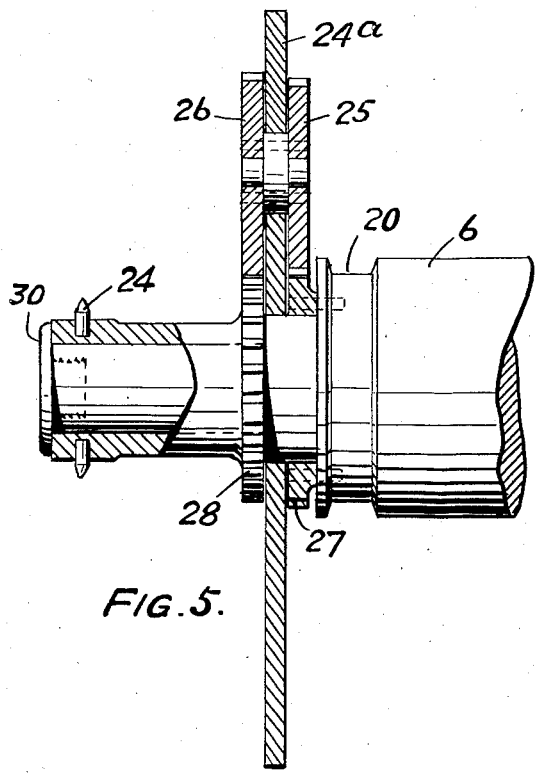
Figs. 5 and 6 are similar views of other forms of driving connections.

In these drawings, the reference character 5 designates all of the fixed frame portions, some of which have been omitted for clearness, and rotatably mounted in suitable bearings in the frame 5 is a spindle 6 to which is connected a suitable support for the rectifying lenses 7, there being four such lenses shown in Fig. 1.

These lenses are surrounded by a suitable fixed frame 5ª, or any other suitable frame, which will cover the rectifying lenses 7 and their supporting devices, as well as form a support for the various elements within the annulus formed by the rectifying lenses.

Supported within a casing 5ª mounted on the frame within the lens annulus is a film feed reel magazine 8 from which the film 9 passes to a take-up reel in magazine 10. These reels are removably mounted on spindles 11 and 12 respectively, and are journaled in the frame 5ª within the lens annulus.

The film passes from the feed reel, over idlers 13 to an idler 14, over an aperture plate 15, a film feed sprocket 16 and idlers 17 to the take-up reel.

The rectifying lens support is driven by means of an electrical motor 18 which is connected to a driving wheel on the spindle 6 by means of a belt 19. The belt 19 is of the sprocket type and the ratio between the motor and the spindle is one to four, so that for each rotation of the motor, one lens 7 will be moved past a given point. The spindle 6 is provided with a groove 20 for the reception of a belt 21, which passes around a driving wheel 22 for the take-up reel spindle 12.

The wheel 22 is not directly connected to spindle 6, but is connected by suitable friction driving connections so as to always maintain a pull on the film to wind the film as rapidly as it is fed by the sprocket wheel 16. The shaft of the film sprocket 16 is provided with a second sprocket wheel, which is driven by a sprocket chain 23 from a sprocket wheel 24 loose on a spindle 6ª, rotatably mounted within spindle 6, and is connected therewith by means of differential gearing so as to be rotated at a higher speed thereby or in synchronism therewith.

Rotatably mounted on the inner end of spindle 6 is a disc 24ª carrying gears 24 and 25. These gears are connected to each other by a short shaft journaled in the disc. Gear wheel 25 meshes with a gear wheel 27 secured to shaft 6, while gear wheel 26 meshes with a gear wheel 28 secured to shaft 6ª.

Gear wheel 27 is provided with forty teeth, gear 25 with thirty-nine teeth, gear 26 with forty teeth and gear 28 with thirty-nine teeth. The connection between shaft or spindle 6 and shaft 6ª are such that if disc 24ª is free to rotate shafts 6 and 6ª will rotate as if fixed to each other, the gears 25 and 26 moving about the axes of shafts 6 and 6ª without rotating about their own axes. If the movement of disc 24ª is retarded, the gearing is such as to drive shaft 6ª at very slightly higher speed than shaft 6 to cause the film to move faster than the rectifying lenses 7. As soon as the pictures on the film and the rectifying lenses have been brought to register to frame the picture, disc 24ª is freed to permit the shafts to rotate together.

In the form shown in Fig. 5, all of the various elements are supported on shaft 6. In this form, disc 24ª is loosely mounted on a shouldered portion of shaft 6. Gear 27 is connected to shaft 6, while gear wheel 28 is connected to sprocket wheel 24, both of which are free to rotate on a reduced portion of shaft 6.

The film is provided with the usual number of sprocket holes for each picture, namely: Four along each marginal edge of the film, and as the sprocket wheel 16 is provided with thirty-two teeth, eight pictures will be drawn past the exhibiting field or opening in the aperture plate 15 for each rotation of the sprocket wheel 16. The shaft of sprocket wheel 16 is connected to sprocket wheel 24 in such a manner that the sprocket wheel 24 makes two revolutions for each revolution of sprocket wheel 16, so that four pictures (one for each rectifying lens 7) are fed past the opening in aperture plate 15 for each cycle of the lenses 7.

31 is a counterbalance of non-magnetic nature on the disc 24ª to counterbalance the weight of gears 25 and 26. Pivotally supported on a pin 32 in brackets connected to the frame 5ª within the compensating lens system are electro-magnets 33, one on each side of disc 24ª. The lower ends of the cores are bored for the reception of the pin 32 and are bifurcated, so that the end of one core is nested within the other, and 34 is a spring connected to the legs of cores of magnets 33 and is arranged to force the upper ends of the cores away from the disc 24ª. 35 are stops for magnets 33 and which are arranged to position their cores with relation to the disc 24ª when the magnets are in their retracted positions. The various elements are made of magnetic material so that when magnets 33 are energized their cores will frictionally engage disc 24ª and retard its motion or stop it if energized a sufficient length of time.

36 is a stop pin for magnets 33 which is arranged to engage the upper ends thereof and form a support to resist their movement with the disc when they are energized. Pivotally mounted on the frame 5 is a bar 37 of magnetic material, carrying magnets 38. The lower ends of the cores of these magnets are secured to bar 37, while the upper ends thereof are curved to fit the metallic portion of the support for lenses 7. The magnets are so supported that when energized they will be drawn toward the lens support and form a brake shoe for the lens support, and when de-energized will move from said support by gravity to a very slight degree. The space between the cores of magnets 38 when de-energized and the support for lenses 7 is just sufficient to provide clearance, so that when the magnets are energized the support will not be subjected to shock. Mounted on the frame within the support for lenses 7 is an electric motor 39, which is connected by a belt to a pulley on spindle 11 of the film feed reel and which is arranged to rewind the film after it has been exhibited. Supported on this same portion of the frame and spaced from aperture plate 15 is an objective lens system 40 which may be adjusted in any well known manner to focus the image on the screen. 41 is a lamp or source of light supported on the frame 5, and 42 is a condenser between the lamp and the lenses 7. The beam of light which passes through the condenser passes through the lenses 7, film 9, opening in aperture plate 15, objective lens system 40 and out through the lenses 7 at the other side of the lens annulus to the screen.

43 is a mat or light beam control device rotatably mounted on a shaft 44 journaled in the frame 5, and which shaft is driven from the shaft of motor 18. The mat is provided with a helical opening which is arranged to follow each picture across the field of exposure and makes one cycle for each picture exposed, and four cycles for each cycle of the lenses 7.

The frictional driving connections between motor 18 and spindle 12 of the take-up reel 10 are such as to readily be disconnected when rewinding from the take-up reel to the feed reel.

Figure 8:
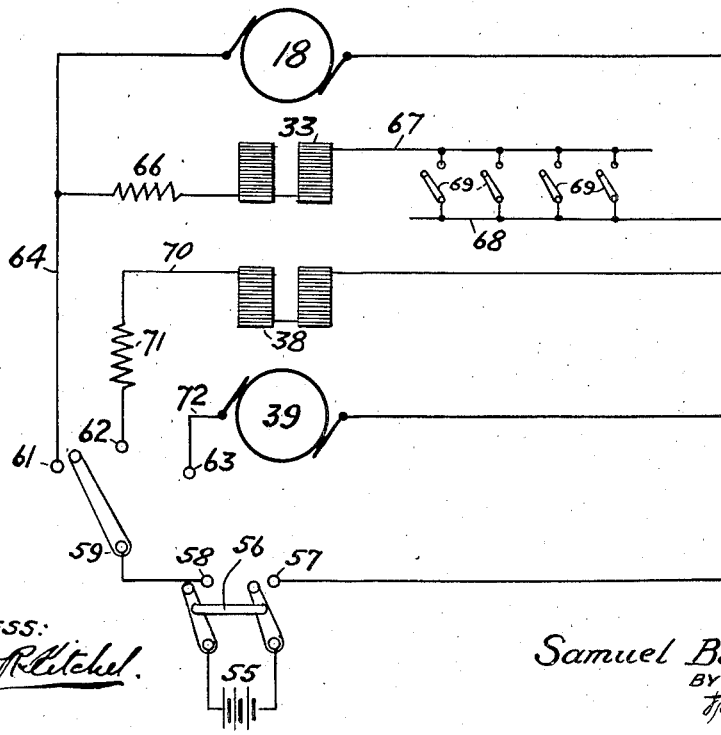
Fig. 8 is a diagram showing the electrical connections.

A simple form of electrical connections is shown in Fig. 8. In this form, 55 is a battery or source of electrical energy and 56 is a main or double pole switch for connecting the apparatus to line. One pole 57 of switch 56 is connected to ground or a return line 65 leading from the various electrical devices of the apparatus, while the other pole 58 thereof is connected to a pole 59 of a three point switch. This three point switch is provided with a switch arm pivotally mounted on pole 59, and is arranged to sweep over contacts 61, 62 and 63, and is arranged to connect any one of said contacts with one side of the source of energy through poles 58 and 59 when the main switch is closed.

One side of the driving motor 18 is connected by wire 64 with contact 61, the other side of the motor being connected to ground or a return line 65 to the other side of the source of electrical energy. One side of framing magnets 33 is connected to wire 64 with an interposed resistance 66, the other side of said magnets being connected to a wire 67 leading to the various framing stations throughout the house or theatre. 68 is a wire leading from the different framing stations to the return wire 65. 69 are switches at the various framing stations, each of which is connected to wires 67 and 68, and are so arranged that when any of said switches are closed, the circuit will be closed through magnets 33 when the circuit is closed through wire 64.

70 is a wire extending from contact 62 to one side of braking magnets 38, the other side of said magnets is connected to ground or return wire 65, and 71 is a resistance in the brake magnet circuit.

One side of rewind motor 39 is connected to contact 63 by wire 72, the other side thereof being connected to return wire 65.

In the operation of the machine, a film feed reel with the film to be exposed is placed on spindle 11 and the film is passed between fire valve idlers 13, over idler 14, around aperture plate 15, and film feed sprocket wheel 16, and then between fire valve idlers 17 to take-up reel. After the film has been properly placed (the main switch 56 being closed), switch arm 60 is moved onto contact 61. This will close the circuit through motor 18, set said motor into motion, and through the various driving connections heretofore described, the rectifying lenses 7, film feeding sprocket wheel 16 and mat 43 will be driven in timed relation to exhibit four pictures for each cycle annulus formed by the lenses 7, while the take-up reel which is frictionally driven at sufficient speed at all times will wind up the film as rapidly as fed by the feed sprocket wheel 16 and maintain the film taut. After the speed of the apparatus has reached a predetermined point, the circuit is closed through the lamp 41 and the rays thereof will be projected by the condenser 42, through the opening in the mat 43, lenses 7, film 8, opening in aperture plate 15, objective lens system 40 and lenses 7 to the screen. If the picture is not properly framed or central on the screen, due to the pictures being out of register with lenses 7, the magnets 33 are energized by closing one of the switches 69, which will check the movement of disc 24ᵃ to speed up the film feed relative to the rectifying lenses, and when the pictures and lenses 7 are in register the switch 69 is opened to permit the film and lenses 7 to move in synchronism.

After the film has been exhibited, the switch lever 60 is shifted onto contact 62 to close the circuit through braking magnets 38 after the circuit to motor 18 is broken. This closing of the circuit through magnets 38 will shift their poles into engagement with the support for lenses 7, and gradually arrest the movement of the apparatus. The film 9 is then arranged to rewind the film as shown in dotted lines on Fig. 1 without passing around the film feed sprocket wheel 16 and aperture plate 15, and switch lever 60 is shifted to contact 63 to close the circuit through motor 39 to rotate reel in magazine 8 and rewind the film thereon. When the film is rewound, the reel is removed and a new reel inserted in place.

In Fig. 5 I have shown the sprocket wheel 24 loosely mounted on a reduced portion of shaft 6 and is connected to, or formed integral with, gear 28. The sprocket wheel 24 and gear 28 are held against endwise movement on the shaft 6 by a screw 30.

Figures 6, 7:
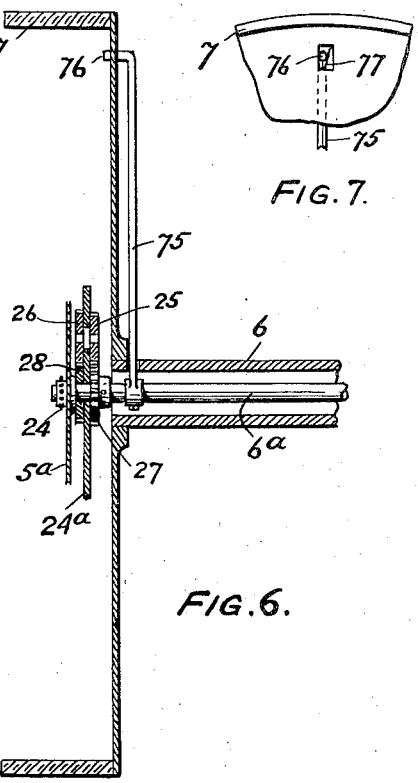
Fig. 7 is a face view showing the driving connections between the two shafts of the form shown in Fig. 6.

In Figs. 6 and 7 I have shown still another form of drive, which is similar to both forms previously described. In this form shafts 6 and 6ᵃ are connected to each other in such a manner as to rotate together and at the same time prevent any vibratory movement being transmitted from shaft 6 to shaft 6ᵃ. In this form the shafts are journaled in the same manner as shown in Fig. 2, and are connected to each other by a lever 75 which is fixedly connected to the shaft 6ᵃ. The outer end of lever 75 is provided with a projection 76 which extends through an opening in the support for the lenses 7, which is mountetd on shaft 6. This projection is held against the wall at the driving side of said opening by a leaf spring 77 and as the opening is elongated to allow radial play of projection 76, the vibrations of the shaft 6 will not be transmitted to shaft 6ᵃ. In this form the gearing is all mounted on shaft 6ᵃ in a manner similiar to that shown in Fig. 5.

The advantages of my invention result from the provision of electro-mechanical means for bringing the pictures on a moving film into register with the exposing mechanism so as to center the picture on the screen and which is arranged to be actuated from various stations to shift the film relative to the exposing devices.

Having now fully described my invention, what I claim and desire to protect by Letters Patent is:

1. A framing device for a motion picture machine having film feeding means, driving means, gearing connecting the film feeding means to the driving means arranged to normally cause both of said means to be rotated in synchronism, means included as an element in said gearing adapted when retarded to cause the speed of the film feeding means to be accelerated to increase its speed over the speed of the driving means, and means for retarding the movement of said element.

2. A framing device for a motion picture machine having a film speeding sprocket wheel, a driving shaft, a train of gears interposed between the sprocket wheel and the driving shaft, some of said gears being carried by a rotating element, the arrangement being such that when said element is free to rotate the sprocket wheel and driving shaft will be rotated in synchronism and when the movement of said element is retarded the gearing will cause the acceleration of the sprocket wheel, and electrically actuated means for retarding the movement of said element.

3. A framing device for a motion picture machine having a hollow driving shaft, a driven shaft concentrically mounted therein, a film feeding sprocket wheel carried by the driven shaft, a gear support rotatably mounted about the axis of said shafts, a gear wheel carried by the driving shaft, a gear wheel carried by the driven shaft, a gear wheel rotatably mounted on said support meshing with the gear on the driving shaft, a second gear wheel rotatably mounted on the support meshing with the gear on the driven shaft, driving connections between the gears on the support, the gearing being so arranged that when the rotation of the gear support is retarded the speed of the driven shaft will be increased, and means for retarding the movement of the gear support.

4. A framing device for a motion picture machine having film feeding mechanism and an optical compensating lens system, means for moving the lens system in a continuous manner, driving connections between the lens system and the film feeding means for moving the film feeding mechanism in timed relation to the lens system to move one picture past a given point for each lens moved past said point, adjusting means between the film feeding mechanism and the lens system to bring the pictures on the film into register with the lens system, and electrically actuated controlling mechanism for said adjusting means.

5. A framing device for a motion picture machine having film feeding mechanism and an optical compensating lens system, means for moving the lens system in a continuous manner, driving connections between the lens system and the film feeding means for moving the film feeding mechanism in timed relation to the lens system to move one picture past a given point for each lens moved past said point, adjusting means between the film feeding mechanism and the lens system to bring the pictures on the film into register with the lens system, electro-magnetic means for actuating the adjusting means, an electric circuit including said electro-magnetic means, and a plurality of switches connected in multiple to said circuit.

6. The combination of a continuously moving film feeding mechanism for feeding a film having a series of successive pictures thereon with a continuously moving compensating lens system of a motion picture machine, and gearing connecting the film feeding mechanism and the compensating lens system to move the pictures in timed relation to the lens system, adjusting means included in said gearing for shifting the film feeding mechanism relative to the lens system, and means for controlling said adjusting means for bringing the pictures into register with the lens system.

7. The combination of a continuously moving film feeding mechanism for feeding a film having a series of successive pictures thereon with a continuously moving compensating lens system of a motion picture machine, and gearing connecting the film feeding mechanism and the compensating lens system to move the pictures in timed relation to the lens system, adjusting means included in said gearing for shifting the film feeding mechanism relative to the lens system, an electrically actuated control device for the adjusting means included in an electrical circuit, and a plurality of circuit closing devices connected in multiple to said circuit.

8. A framing device for a motion picture machine having an optical compensating lens system, a driving shaft to which said lens system is connected, film feeding mechanism, driving connections between the film feeding mechanism and the lens system, said driving connections including intermeshing gears and a rotatable gear support arranged to drive the film feeding mechanism and the lens system in timed relation when the gear support is free to rotate and to increase the speed of the film feeding mechanism when the rotation of the support is retarded, and electrically actuated means for retarding the rotation of the support.

9. A motion picture machine having an optical compensating system, a hollow shaft to which said system is connected, bearings for said shaft, driving means for said shaft, film feeding mechanism including a sprocket wheel for driving the film feeding mechanism, a shaft for the sprocket wheel concentrically mounted in the hollow shaft, a gear wheel on the hollow shaft, a gear wheel on the sprocket wheel shaft of smaller diameter than the gear wheel on the hollow shaft, a disc rotatably mounted about the axis of the said shafts, a gear wheel rotatably mounted on the disc meshing with the gear on the hollow shaft, a second gear wheel on the disc connected to the other gear thereon and of greater diameter meshing with the gear wheel on the sprocket wheel shaft, and an electrically actuated brake for retarding the rotation of the disc to increase the speed of the sprocket wheel shaft over the speed of the hollow shaft.

10. A motion picture machine having an optical compensating lens supporting drum connected to a hollow shaft, a film driving sprocket wheel connected to a shaft rotatably mounted in the hollow shaft and concentric therewith, a gear wheel mounted on the hollow shaft within the drum, a gear wheel of smaller diameter than the first gear wheel mounted on the sprocket wheel shaft, a disc rotatably mounted on the hollow shaft between the two gears, a shaft rotatably mounted in the disc, two gear wheels connected to the shaft mounted on the disc, one on one side of the disc meshing with the gear on the hollow shaft, the other on the other side of the disc meshing with the gear wheel on the sprocket shaft, and an electrically actuated brake for the disc arranged to retard the movement thereof when applied and thereby increase the speed of the sprocket wheel shaft over the speed of the lens drum shaft.

In testimony of which invention, I have hereunto set my hand, at Philadelphia, Pa., on this 13th day of May, 1922.

SAMUEL BARDY.